United States Patent
Sandler et al.

(10) Patent No.: US 9,594,946 B2
(45) Date of Patent: *Mar. 14, 2017

(54) IMAGE PRODUCT CREATION BASED ON FACE IMAGES GROUPED USING IMAGE PRODUCT STATISTICS

(71) Applicant: Shutterfly, Inc., Redwood City, CA (US)

(72) Inventors: Roman Sandler, Haifa (IL); Alexander M. Kenis, Kiryat Motzkin (IL)

(73) Assignee: Shutterfly, Inc., Redwood City, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/270,977

(22) Filed: Sep. 20, 2016

(65) Prior Publication Data
US 2017/0011256 A1    Jan. 12, 2017

Related U.S. Application Data

(63) Continuation-in-part of application No. 14/699,604, filed on Apr. 29, 2015, now Pat. No. 9,495,617, which is a continuation-in-part of application No. 14/272,809, filed on May 8, 2014, now Pat. No. 9,280,701.

(51) Int. Cl.
G06K 9/00 (2006.01)
G06K 9/62 (2006.01)

(52) U.S. Cl.
CPC ....... G06K 9/00228 (2013.01); G06K 9/6268 (2013.01)

(58) Field of Classification Search
None
See application file for complete search history.

(56) References Cited

U.S. PATENT DOCUMENTS

| | | |
|---|---|---|
| 8,503,739 B2 | 8/2013 | Bourdev |
| 2011/0038512 A1 | 2/2011 | Petrou |
| 2011/0211736 A1 | 9/2011 | Krupka |

Primary Examiner — Sumati Lefkowitz
Assistant Examiner — David Perlman
(74) Attorney, Agent, or Firm — Xin Wen

(57) ABSTRACT

A computer-implemented method for creating an image product by accurately grouping faces includes receiving an initial set of face groups for a plurality of face images, training classifiers between pairs of face groups in the initial set of face groups using image-product statistics by a computer processor, classifying the plurality of face images by classifiers to output binary vectors for the plurality of face images by the computer processor, calculating a value for an improved similarity function using the binary vectors for each pair of the plurality of face images, grouping the plurality of face images into modified face groups based on values of the binary similarity functions by the computer processor, and creating an image product based at least in part on the modified face groups.

11 Claims, 3 Drawing Sheets

IMAGE PRODUCT CREATION BASED ON FACE IMAGES GROUPED USING IMAGE PRODUCT STATISTICS

TECHNICAL FIELD

This application relates to technologies for automatically creating image-based products, and more specifically, to creating image-based products that best present people's faces.

BACKGROUND OF THE INVENTION

In recent years, photography has been rapidly transformed from chemical based technologies to digital imaging technologies. Images captured by digital cameras can be stored in computers and viewed on display devices. Users can also produce image prints based on the digital images. Such image prints can be generated locally using output devices such an inkjet printer or a dye sublimation printer or remotely by a photo printing service provider. Other products that can be produced using the digital images can include photo books, photo calendars, photo mug, photo T-shirt, and so on. A photo book can include a cover page and a plurality of image pages each containing one or more images. Designing a photobook can include many iterative steps such as selecting suitable images, selecting layout, selecting images for each page, selecting backgrounds, picture frames, overall Style, add text, choose text font, and rearrange the pages, images and text, which can be quite time consuming. It is desirable to provide methods to allow users to design and produce photo albums in a time efficient manner.

Many digital images contain people's faces; creating high-quality image products naturally requires proper consideration of people faces. For example the most important and relevant people such as family members should have their faces be shown in image products while strangers' faces should be minimized. In another example, while pictures of different faces at a same scene can be included in an image-based product, the pictures of a same person at a same scene should normally be filtered to allow the best one(s) to be presented in the image product.

Faces need to be detected and group based on persons' identities before they can be properly selected and placed in image products. Most conventional face detection techniques concentrate on face recognition, assuming that a region of an image containing a single face has already been detected and extracted and will be provided as an input. Common face detection methods include: knowledge-based methods; feature-invariant approaches, including the identification of facial features, texture and skin color; template matching methods, both fixed and deformable; and appearance based methods. After faces are detected, face images of each individual can be categorized into a group regardless whether the identity of the individual is known or not. For example, if two individuals Person A and Person B are detected in ten images. Each of the images can be categorized or tagged one of the four types: A only; B only, A and B; or neither A nor B. Algorithmically, the tagging of face images require training based one face images or face models or known persons, for example, the face images of family members or friends of a user who uploaded the images.

There is still a need for more accurate methods to accurately group face images for different persons and incorporate the face images in image products.

SUMMARY OF THE INVENTION

The present application discloses computer implemented methods that automatically categorize face images that belong to different persons. The methods are based on the statistics of the face images to be categorized, and do not require prior retraining with known people' faces or supervision during the grouping of face images. Acceptance criteria in the methods are based on probabilistic description and can be adjusted.

Moreover, the disclosed methods are applicable to different similarity functions, and are compatible with different types of face analyses and face descriptors.

In a general aspect, the present invention relates to a computer-implemented method for creating an image product by accurately grouping faces. The computer-implemented method includes receiving an initial set of n* face groups for a plurality of face images, wherein n* is a positive integer bigger than 1; training classifiers between pairs of face groups in the initial set of face groups using image-product statistics by a computer processor; classifying the plurality of face images by $n*(n*-1)/2$ classifiers to output binary vectors for the plurality of face images by the computer processor; calculating a value for an improved similarity function using the binary vectors for each pair of the plurality of face images; grouping the plurality of face images into modified face groups based on values of the binary similarity functions by the computer processor; and creating an image product based at least in part on the modified face groups.

Implementations of the system may include one or more of the following. The computer-implemented method can further include comparing a difference between the modified face groups and the initial face groups to a threshold value, wherein the image product is created based at least in part on the modified face groups if the difference is smaller than the threshold value. If the difference is larger than the threshold value, the steps of training classifiers, classifying the plurality of face images, calculating a value for an improved similarity function, and grouping the plurality of face images into modified face groups are repeated to improve the modified face groups. There are an integer m number of face images in the plurality of face images, wherein the step of classifying the plurality of face images by $n*(n*-1)/2$ classifiers outputs m number of binary vectors. The plurality of face images can be grouped into modified face groups using non-negative matrix factorization based on values of the improved similarity functions. The image-product statistics can include frequencies of faces that appear in the plurality of face images. The plurality of face images can be extracted from images contained in one or more photo albums. The image-product statistics can include frequencies of faces that appear in image products. The image-product statistics can be based on if a largest modified face group is related to a VIP person.

In another general aspect, the present invention relates to a computer-implemented method for creating an image product by accurately grouping faces. The computer-implemented method can include obtaining face images comprising faces of unknown individuals by a computer processor; calculating similarity functions between pairs of face images by the computer processor; joining face images that have values of the similarity functions above a predetermined threshold into a hypothetical face group, wherein the face images in the hypothetical face group hypothetically belong to a same person; conducting non-negative matrix factorization on values of the similarity functions in the hypothetical face group to test truthfulness of the hypothetical face group; identifying the hypothetical face group as a true face group if a percentage of the associated similarity functions being true is above a threshold based on the non-negative matrix factorization; and creating an image product based at least in part on the true face group.

Implementations of the system may include one or more of the following. The computer-implemented method can further include rejecting the hypothetical face group as a true face group if a percentage of the associated similarity functions being true is below a threshold. The step of conducting non-negative matrix factorization can include forming a non-negative matrix using values of similarity functions between all different pairs of face images in the hypothetical face group, wherein the non-negative matrix factorization is conducted over the non-negative matrix. The similarity functions in the hypothetical face group can be described in a similarity distribution function, wherein the step of non-negative matrix factorization outputs a True similarity distribution function and a False similarity distribution function. The step of identifying can include comparing the similarity distribution function to the True similarity distribution function and the False similarity distribution function. Every pair of face images in the hypothetical face group has a similarity function above the predetermined threshold. The computer-implemented method can further include joining two true face groups to form a joint face group; conducting non-negative matrix factorization on values of similarity functions in the joint face group; and merging the two true face groups if a percentage of the associated similarity functions being true is above a threshold in the joint face group. The similarity functions in the joint face group can be described in a similarity distribution function, wherein the step of conducting non-negative matrix factorization on values of similarity functions in the joint face group outputs a True similarity distribution function and a False similarity distribution function. The step of identifying can include comparing the similarity distribution function to the True similarity distribution function and the False similarity distribution function. The computer-implemented method can further include detecting the faces in images; and cropping portions of the images to produce the face images comprising faces of the unknown individuals.

These and other aspects, their implementations and other features are described in detail in the drawings, the description and the claims.

DETAILED DESCRIPTION OF THE INVENTION

Figure 1:
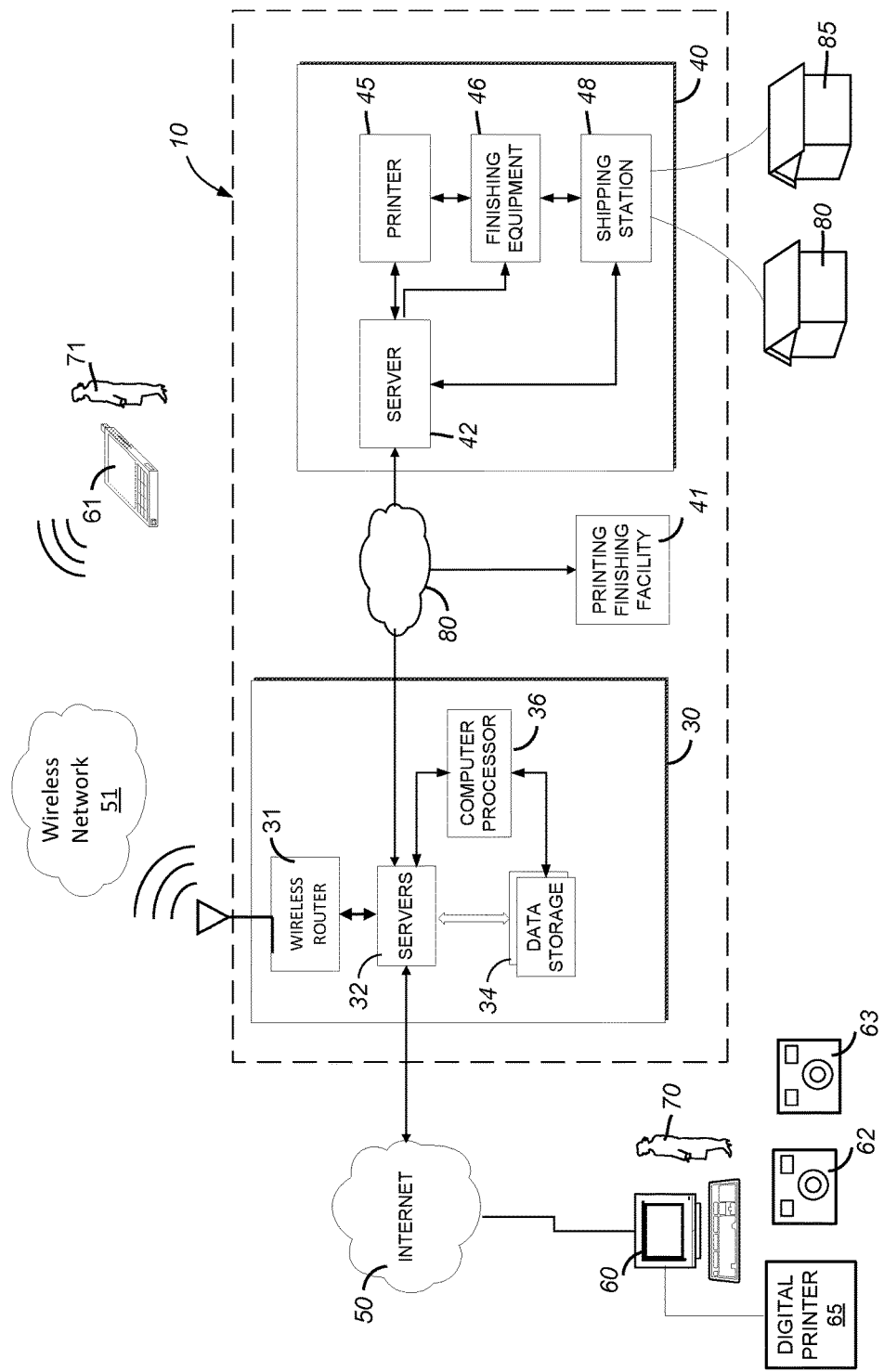
FIG. 1 is a block diagram for a network-based system for producing personalized image products, image designs, or image projects compatible with the present invention.

Referring to FIG. 1, a network-based imaging service system 10 can enable users 70, 71 to organize and share images via a wired network or a wireless network 51. The network-based imaging service system 10 is operated by an image service provider such as Shutterfly, Inc. Optionally, the network-based imaging service system 10 can also fulfill image products ordered by the users 70, 71. The network-based imaging service system 10 includes a data center 30, one or more product fulfillment centers 40, 41, and a computer network 80 that facilitates the communications between the data center 30 and the product fulfillment centers 40, 41.

The data center 30 includes one or more servers 32 for communicating with the users 70, 71, a data storage 34 for storing user data, image and design data, and product information, and computer processor(s) 36 for rendering images and product designs, organizing images, and processing orders. The user data can include account information, discount information, and order information associated with the user. A website can be powered by the servers 32 and can be accessed by the user 70 using a computer device 60 via the Internet 50, or by the user 71 using a wireless device 61 via the wireless network 51. The servers 32 can also support a mobile application to be downloaded onto wireless devices 61.

The network-based imaging service system 10 can provide products that require user participations in designs and personalization. Examples of these products include the personalized image products that incorporate photos provided by the users, the image service provider, or other sources. In the present disclosure, the term "personalized" refers to information that is specific to the recipient, the user, the gift product, and the occasion, which can include personalized content, personalized text messages, personalized images, and personalized designs that can be incorporated in the image products. The content of personalization can be provided by a user or selected by the user from a library of content provided by the service provider. The term "personalized information" can also be referred to as "individualized information" or "customized information".

Personalized image products can include users' photos, personalized text, personalized designs, and content licensed from a third party. Examples of personalized image products may include photobooks, personalized greeting cards, photo stationeries, photo or image prints, photo posters, photo banners, photo playing cards, photo T-shirts, photo mugs, photo aprons, photo magnets, photo mouse pads, a photo phone case, a case for a tablet computer, photo key-chains, photo collectors, photo coasters, photo banners, or other types of photo gift or novelty item. The term photobook generally refers to as bound multi-page product that includes at least one image on a book page. Photobooks can include photo albums, scrapbooks, bound photo calendars, or photo snap books, etc. An image product can include a single page or multiple pages. Each page can include one or more images, text, and design elements. Some of the images may be laid out in an image collage.

The user 70 or his/her family may own multiple cameras 62, 63. The user 70 transfers images from cameras 62, 63 to the computer device 60. The user 70 can edit, organize images from the cameras 62, 63 on the computer device 60. The computer device 60 can be in many different forms: a personal computer, a laptop, or tablet computer, a mobile phone etc. The camera 62 can include an image capture device integrated in or connected with in the computer device 60. For example, laptop computers or computer monitors can include built-in camera for picture taking. The user 70 can also print pictures using a printer 65 and make image products based on the images from the cameras 62, 63. Examples for the cameras 62, 63 include a digital camera, a camera phone, a video camera capable of taking motion and still images, a laptop computer, or a tablet computer.

Images in the cameras 62, 63 can be uploaded to the server 32 to allow the user 70 to organize and render images at the website, share the images with others, and design or order image product using the images from the cameras 62, 63. The wireless device 61 can include a mobile phone, a tablet computer, or a laptop computer, etc. The wireless device 61 can include a built-in camera (e.g. in the case of a camera phone). The pictures taken by the user 71 using the wireless device 61 can be uploaded to the data center 30. If users 70, 71 are members of a family or associated in a group (e.g. a soccer team), the images from the cameras 62, 63 and the mobile device 61 can be grouped together to be incorporated into an image product such as a photobook, or used in a blog page for an event such as a soccer game.

The users 70, 71 can order a physical product based on the design of the image product, which can be manufactured by the printing and finishing facilities 40 and 41. A recipient receives the physical product with messages from the users at locations 80, 85. The recipient can also receive a digital version of the design of the image product over the Internet 50 and/or a wireless network 51. For example, the recipient can receive, on her mobile phone, an electronic version of the greeting card signed by handwritten signatures from her family members.

The creation of personalized image products, however, can take considerable amount of time and effort. In some occasions, several people may want to contribute to a common image product. For example, a group of people may want or need to jointly sign their names, and write comments on a get-well card, a baby-shower card, a wedding-gift card. The group of people may be at different locations. In particular, it will be desirable to enable the group of people to quickly write their names and messages in the common image product using mobile devices.

The images stored in the data storage 34, the computer device 60, or the mobile device 61 can be associated with metadata that characterize the images. Examples of such data include image size or resolutions, image colors, image capture time and locations, image exposure conditions, image editing parameters, image borders, etc. The metadata can also include user input parameters such as the occasions for which the images were taken, favorite rating of the photo, keyword, and the folder or the group to which the images are assigned, etc. For many image applications, especially for creating personalized image products or digital photo stories, it is beneficial to recognize and identify people's faces in the images stored in the data storage 34, the computer device 60, or the mobile device 61. For example, when a family photobook is to be created, it would very helpful to be able to automatically find photos that include members within that family.

Figure 2:
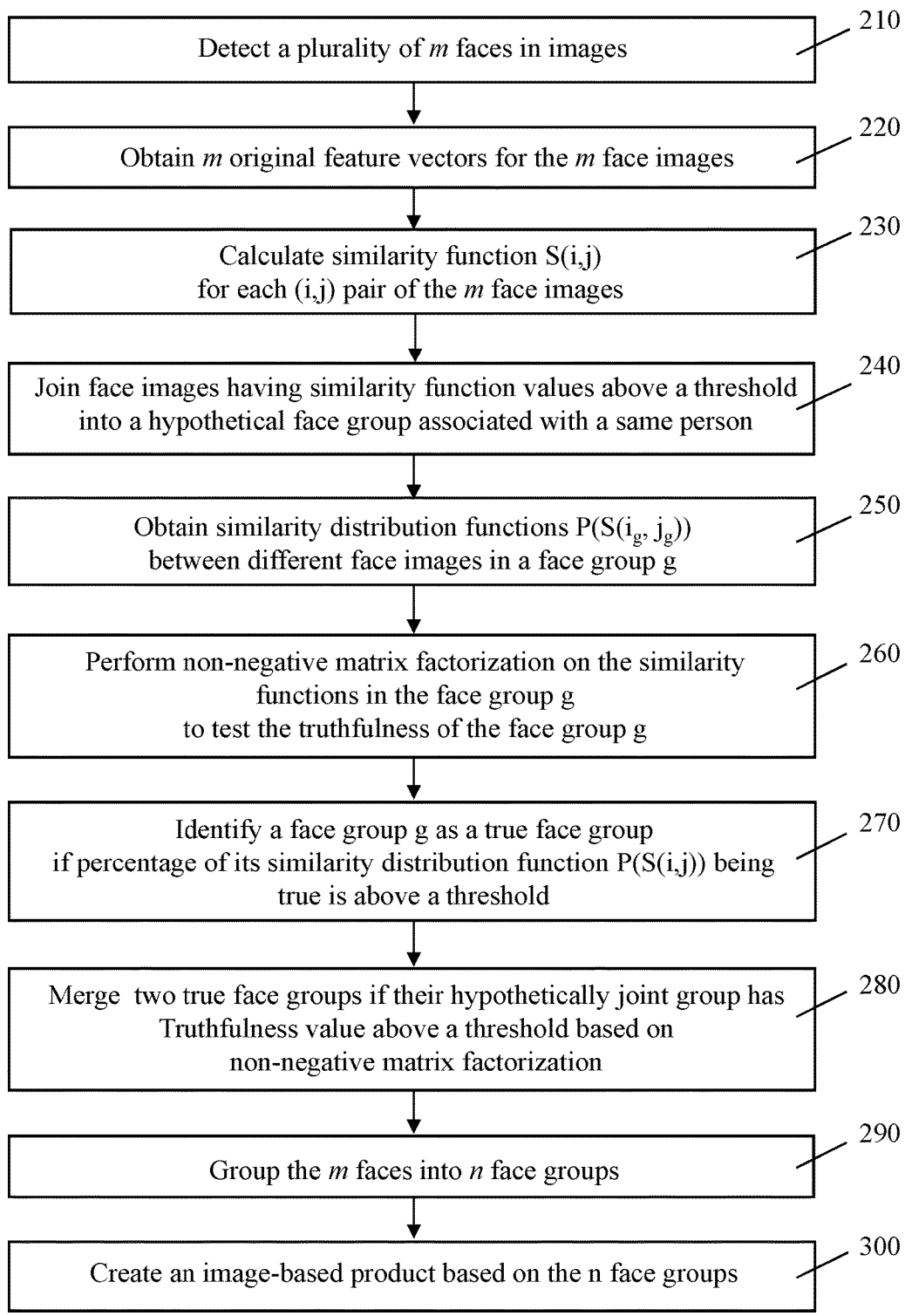
FIG. 2 is a flow diagram for categorizing face images that belong to different persons in accordance with the present invention.

Referring to FIGS. 1 and 2, faces are detected and grouped by individual persons before images are selected and incorporated into image products. M number of faces can be detected in the digital images by the computer processor 36, the computer device 60, or the mobile device 61 (step 210). The portions of the images that contain the detected faces are cropped out to produce face images, each of which usually includes a single face.

M feature vectors are then obtained for the m face images (step 220). In pattern recognition and machine learning, a feature vector is an n-dimensional vector of numerical features that represent some objects (i.e. a face image in the present disclosure). Representing human faces by numerical feature vectors can facilitate processing and statistical analysis of the human faces. The vector space associated with these vectors is often called the feature space.

Similarity function S(i,j) for each pair of face images i and j among the detected faces are then calculated (step 230). The disclosed method is generally not restricted to the specific design of similarity function S(i,j). The similar function can be based on inner products of feature vectors from two face image.

$$S(i, j) = \frac{f_i^T f_j}{\|f_i\| \|f_j\|} \quad (1)$$

In another example, two face images can be compared to an etalon set of faces. Similar faces will be similar to the same third party faces and dissimilar with the others. Eigenspace best describing all album faces is calculated. The similarity between the two face images is the exponent of minus distance between the two face feature vectors in this space.

For ease of computation, the similarity function can be scaled to a numeric range between −1 and 1, that is, −1≤S(i,i)≤1. For two identical face images i, S(i,i)=1. In general, the average similarity value between face images of a same person is larger than the average similarity function value between face images of different people.

The similarity value between a pair of face images is related to the probability that the two face images belonging to a same person, but it does not tell which face images together belong to a hypothetical person (identifiable or not). The present method disclosure statistically assesses the probability that a group of face images are indeed faces of the same person. In some embodiments, the values of similarity functions for different pairs of face images are compared to a threshold value T. The face images that are connected through a chain of similarity values higher than T are joined into a hypothetical face group g that potentially belongs to a single person (step 240).

This process is generally known as greedy join. In principle, if ground truth is known, the hypotheses created this way can be assessed using the basic analysis and the overall precision and recall associated with T can be estimated. Since the ground truth in not known, the quality of the hypothesis will be estimated in a different way, as described below. Moreover, by repeating greedy join for different thresholds we can find T associated with the best estimate. Applying greedy join for this threshold results in good face groups.

Once the groups {g} are constructed by greedy join for random values of T, a similarity distribution function {P(S(i$_g$, j$_g$))} between different pairs of face images in each face group g is obtained (step 250). Face images in each face group g are characterized by a similar distribution function P(S(i,j)), which is the probability distribution of similarity function values for all different pairs of face images in the face group g. The similarity distribution function {P(S(i$_g$, j$_g$))} has a plurality of similarity function values S(i$_g$, j$_g$) for different pair of face images i, j.

In some aspects, the use of the similar distribution function P(S(i,j)) to describe a group of face images in the disclosed method is based on several empiric observations: In a given small (<100) set of face images, the similarities inside true face groups (face images of the same person) have the same similarity distribution P$_{true}$(S), where both i and j are faces in the same face group. The similarities between faces of different persons are distributed with similarity distribution $P_{false}(S)$. For larger face sets, several $P_{true}(S)$ distributions are established. Thus, when $P_{true}$ and $P_{false}$ are known, we can assess how many of the face pairs in a group of face images are of the same persons by solving a linear regression.

Next, non-negative matrix factorization is performed on the similarity distribution function $\{P(S(i_g j_g))\}$ to estimate $\{P_{true}, P_{false}\}$ and test the truthfulness of the face groups $\{g\}$ (step 260). The similarity distribution function $\{P(S(i_g j_g))\}$ has non-negative values for different $S(i_g j_g)$'s. Organized in vectors they form a non-negative matrix. Non-negative matrix factorization (NMF) is a group of algorithms in multivariate analysis and linear algebra where a matrix V is factorized into two or more non-negative matrices. This non-negativity makes the resulting matrices easier to analyze. NMF in general is not exactly solvable; it is commonly approximated numerically. Specifically, the resulting factor matrices are initialized with random values, or using some problem-tied heuristic. Then, all-but-one of the factors are fixed, and the remaining matrix values are solved, e.g., by regression. This process is continued for each factor matrix. The iterations continue until conversion.

An output of NMF is a matrix having columns $P_{true}$ and $P_{false}$. Another result of NMF is a matrix for determining similarities of the hypothesized face groups to $P_{true}$ and $P_{false}$ distributions. Face groups that are similar to the "true" distribution are accepted as good face groups. Other face groups are ignored. It should be noted that $P_{true}$ and $P_{false}$ distributions can be different for each group of face images. Thus the NMF needs to be performed for every group of user images of interest, such as each user album.

In one general aspect, rather than characterizing each face separately, the presently disclosed method characterizes a face image by a distribution of its similarities to all other face images in the same face group. Thus, when P_true(S) and P_false(S) are known, P(S(i,j)) can be tested to see how close it is to P_true and P_false by solving linear equation. Furthermore, the obtained weights (i.e. precision in data analysis) specify how many pairs in P(S(i,j)) belong to P_true(S) and the rest part of P(S(i,j)) belongs to P_false(S). A face group g is identified as a true face group if percentage of its similarity distribution function P(S(i,j)) being true is above a threshold (step 270). A face group is rejected if it has P(S(i,j)) values that have "truthfulness" less than a predetermined percentage value.

In an often occurring example, a wrong face is highly similar to a single face in a face group, but is dissimilar to all face images in the same face group. In this case, P(S(i,j)) similar to P_false, and the merge between the wrong face and the face group is rejected. In another example, a face has relatively low similarity to all face images in a group, but P(S(i,j)) can still be more similar to P_true and the merge is be accepted. The main benefit of the presently disclosed approach is that it does not define rules on similarities or dissimilarities between a pair of individual faces. The determination if a face image belongs to a face group is statistical and based on the collective similarity properties a whole of face images.

After accepting some of the initial groups, there can still be true face groups and single faces that need to be joined. For every group pair $(g_1, g_2)$, a joint hypothesis group $h_{12}$ is considered ($g_i$ can be a single face). $P_{true}(S)$ and $P_{false}(S)$ are calculated using NMF as described above to test if face pair similarities of $h_{ij}$ has high precision (i.e. similarity functions in the joint face group are true above a predetermined threshold) and, thus, groups $g_i$ and $g_j$ should be merged (step 280). Accurate hypotheses are accepted and the overall recall rises. This enhancement method allows merging faces that associated by relatively low similarity between them, without merging all faces associated with this similarity, as done by the greedy join method.

As a result, n face groups representing n hypothetical persons are obtained from the m face images (step 290).

An image-based product can then then created based in part on the n face groups (step 300). The m face images that are grouped can be extracted from images contained in one or more photo albums. The image product can be automatically created by the computer processor 36, the computer device 60, or the mobile device 61 (FIG. 1), then presented to a user 70 or 71 (FIG. 1), which allows the image product be ordered and made by the printing and finishing facilities 40 and 41 (FIG. 1). The image product creation can also include partial user input or selection on styles, themes, format, or sizes of an image product, or text to be incorporated into an image product. The detection and grouping of face images can significantly reduce time used for design and creation, and improve the accuracy and appeal of an image product. For example, the most important people can be determined and to be emphasized in an image product. Redundant person's face images can be filtered and selected before incorporated into an image product. Irrelevant persons can be minimized or avoided in the image product.

Although the method shown in FIG. 2 and described above can provide a rather effective way of grouping faces for creating image products, it can be improved further incorporating knowledge or intelligence about the general nature and statistics of image products, and about the users (the product designer or orderers, the recipients, and the people who appear in the photos in the image products) of the image products.

Figure 3:
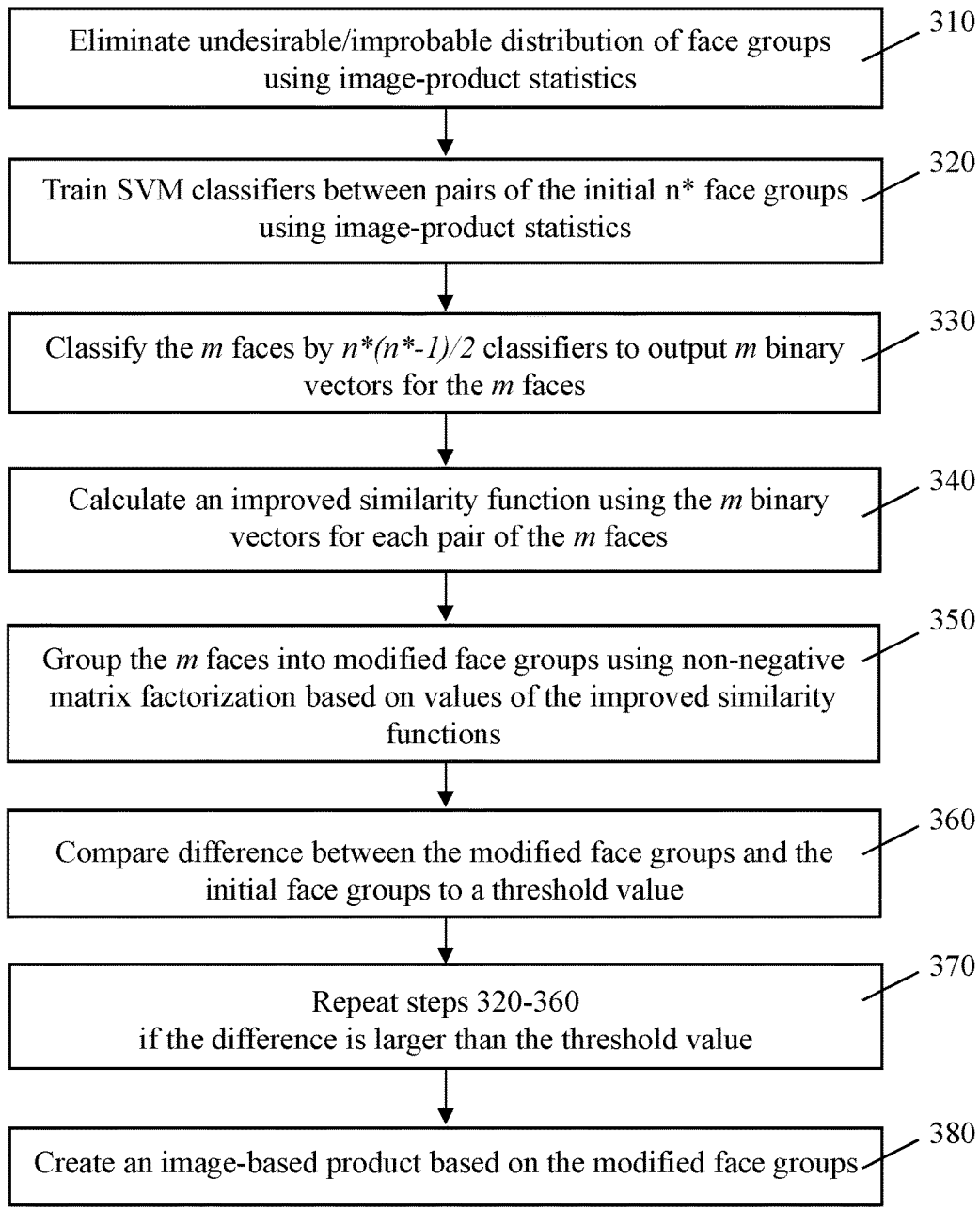
FIG. 3 is a flow diagram for identifying face images in accordance with the present invention.

In some embodiments, referring to FIG. 3, initial face groups are evaluated; the ones having undesirable/improbable distributions are first eliminated using image-product statistics (step 310). Each face can be described by a feature vector of several hundred values. The initial face groups can be obtained in different ways, including the fully automated computer methods such as the one described above in relation to FIG. 2, or partially and fully manual methods with assistance of the users. Leading image product service providers (such as Shutterfly, Inc.) have accumulated vast amount of statistics about the appearance of people's faces in image products. For example, it has been discovered that most family albums or family photobooks typically include 2-4 main characters that appear at high frequencies in each photobook, and the frequencies for other people's faces drastically decrease in the photobook. In another example, the people whose faces appear in pictures ca be assigned as VIP persons and non-VIP persons. It is highly improbable that a non-VIP person will be associated with the largest face group in a photo album. In another example, products ordered by the customer are tracked and stored in a database. The largest groups in the photo albums are cross referenced with and found to be highly correlated with the most frequent faces in already purchased products.

Next, support vector machine (SVM) classifiers are trained between pairs of the n* face groups $(g_i, g_j)$ using image-product statistics (step 320). Each of the n* face groups represents a potentially unique person. For the n* face groups, there are n*(n*−1)/2 such classifiers. In the first iteration, the n* face groups are the same as the initial input face groups. As it is described in steps 330-370 below, the number n* of face groups as well as face compositions within the face groups can vary as the face grouping converges in consecutive iterations.

In general, face similarity functions can be built based on different features such as two-dimensional or two-dimensional features obtained with the aid of different filters, biometric distances, image masks, etc. In conventional face categorization technologies, it is often a change to properly define and normalize of similarity or distance between the faces, in the Euclidian (or other) spaces. To address this issue, face similarity functions are defined using SVM in the presently disclosed method. Each photo album or photobook can include several hundreds, or even several thousands of faces. SVM is a suitable tool for classifying faces at this scale. The task of face grouping does not use training information, which is different from face recognition. If identities of people in photos of a photo album or photo collection are beforehand and have their face images are available, face recognition instead of face grouping can be conducted using SVM.

In the disclosed method, external knowledge on general properties and statistics of faces in photo albums or photo collections is combined with methodology of transductive support vector machines (TSVM). TSVM allows using non-labeled (test) data points for SVM training, improving by this the separation of the test data during the learning. A prior knowledge about photo albums or collections is that they contain face pairs that are more likely to belong to the same person than other pairs (from different photo collections). Moreover, the frequencies of people's appearances in a photo album or a photo collection is usually distributed exponentially, meaning, that main face groups are built by 2-3 main characters and the rest of participants appear only several times at most. Thus, iterative grouping and learning from the most probable recognitions can help classify faces in ambiguous cases. The face models created by the initial grouping can be used to improve the face grouping itself. Other knowledge about an image album and image collection can include titles, keywords, occasions, as well as time and geolocations associated or input in association with each image album or image collection.

Next, the m faces $f_1, \ldots, f_m$ are classified by $n^*(n^*-1)/2$ classifiers to output m binary vectors $c_1, \ldots, c_m$ for the m faces (step 330). The binary vectors $c_1, \ldots, c_m$ can have values of 0 or 1: $c_k=1$ if the face is classified as similar to a classifier number k, and otherwise, $c_k=0$.

An improved similarity function is calculated using the m binary vectors for each pair of the m faces (step 340):

$$S(i, j) = \frac{\sum_{k=1}^{n(n-1)/2} XOR(c_{ik}, c_{jk})}{n(n-1)} - 1 \quad (2)$$

The m faces are then grouped into modified face groups using non-negative matrix factorization based on values of the improved similarity functions (step 350). The operation is similar to those described above in step 260 (FIG. 2) but with improved accuracy in face grouping. In this step, the initial face groups in this iteration may be spit or merged to form new face groups or alter compositions in existing face groups.

The difference between the modified face groups $\{g^*\}$ and the initial face groups $\{g\}$ in the same iteration is calculated (e.g. using norm of similarity matrices for m faces) and compared to a threshold value (step 360). The threshold value can be a constant and/or found empirically. Steps 320-360 are repeated (step 370) if the difference is larger than the threshold value. In other words, the process of training SVM classifiers, calculating binary functions, and grouping based on the binary functions are repeated till the face groups converge to a stable set of groups.

When a stable set of modified face groups $\{g^*\}$ are obtained, they are used to create image products (step 380) such as photobooks, photo calendars, photo greeting cards, or photo mugs. The image product can be automatically created by the computer processor 36, the computer device 60, or the mobile device 61 (FIG. 1), then presented to a user 70 or 71 (FIG. 1), which allows the image product be ordered and made by the printing and finishing facilities 40 and 41 (FIG. 1). The image product creation can also include partial user input or selection on styles, themes, format, or sizes of an image product, or text to be incorporated into an image product. The detection and grouping of face images can significantly reduce time used for design and creation, and improve the accuracy and appeal of an image product.

With the input of knowledge about the image products and users, the modified face groups are more accurate than the method shown in FIG. 2. The modified face groups can be used in different ways when incorporating photos into image products. For example, the most important people (in a family or close friend circle) can be determined and to be emphasized in an image product such as automatic VIPs in the image cloud recognition service. Redundant person's face images (of the same or similar scenes) can be filtered and selected before incorporated into an image product. Unimportant people or strangers can be minimized or avoided in the image product.

The disclosed methods can include one or more of the following advantages. The disclosed face grouping method does not rely on the prior knowledge about who are in the photo album or photo collection, and thus are more flexible and easier to use. The disclosed face grouping method has the benefits of improved accuracy in grouping faces (more accurate merging and splitting), improved relevance of grouping faces to image products, and improved relevance of grouping faces to families and close friends.

It should be understood that the presently disclosed systems and methods can be compatible with different devices or applications other than the examples described above. For example, the disclosed method is suitable for desktop, tablet computers, mobile phones and other types of network connectable computer devices.

What is claimed is:

1. A computer-implemented method for creating an image product by accurately grouping faces, comprising:
   training classifiers between pairs of face groups in an initial set of n* face groups by a computer processor, wherein the initial set of n* face groups comprises a plurality of face images, wherein each of the initial set of n* face groups comprises one or more face images in the plurality of face images, wherein n* is a positive integer bigger than 1;
   classifying the plurality of face images by $n^*(n^*-1)/2$ classifiers by the computer processor to output binary vectors each associated with one of the plurality of face images;
   calculating a value of a similarity function for each pair of face images in the plurality of face images using the binary vectors associated with the respective pair of face images;

grouping the plurality of face images into modified face groups by the computer processor based on values of similarity functions associated with different pairs of face images; and creating an image product based at least in part on the modified face groups.

2. The computer-implemented method of claim 1, further comprising:

comparing a difference between the modified face groups and the initial set of n* face groups to a threshold value, wherein the image product is created based at least in part on the modified face groups if the difference is smaller than the threshold value.

3. The computer-implemented method of claim 2, wherein if the difference is larger than the threshold value, the computer-implemented method further comprising:

repeating the steps of training classifiers, classifying the plurality of face images, calculating a value of the similarity function, and grouping the plurality of face images into modified face groups to update the modified face groups.

4. The computer-implemented method of claim 1, wherein there are an integer m number of face images in the plurality of face images, wherein the step of classifying the plurality of face images by $n*(n*-1)/2$ classifiers outputs m number of binary vectors each corresponding to one of the m number of face images.

5. The computer-implemented method of claim 1, wherein the plurality of face images are grouped into modified face groups using non-negative matrix factorization based on values of the similarity functions between pairs of face images.

6. The computer-implemented method of claim 1, wherein the binary vector associated with one of the plurality of face images has one of two binary values corresponding to each of the $n*(n*-1)/2$ classifiers.

7. The computer-implemented method of claim 6, wherein the similarity function for a pair of face images in the plurality of face images includes a XOR function of the binary values of the binary vectors associated with the pair of face images for each of the $n*(n*-1)/2$ classifiers.

8. The computer-implemented method of claim 1, wherein the classifiers between pairs of face groups in an initial set of n* face groups are trained using frequencies of faces that appear in the plurality of face images.

9. The computer-implemented method of claim 1, wherein the plurality of face images are extracted from images contained in one or more photo albums.

10. The computer-implemented method of claim 1, wherein the classifiers between pairs of face groups in an initial set of n* face groups are trained using frequencies of face images that appear in image products.

11. The computer-implemented method of claim 1, wherein the classifiers between pairs of face groups in an initial set of n* face groups are trained based on whether a largest modified face group is related to a VIP person.

* * * * *